(12) United States Patent
Ziemer

(10) Patent No.: US 8,206,258 B2
(45) Date of Patent: Jun. 26, 2012

(54) ARRANGEMENT OF A PLANETARY GEARSET

(75) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 242 days.

(21) Appl. No.: 12/793,946

(22) Filed: Jun. 4, 2010

(65) Prior Publication Data
US 2010/0311537 A1 Dec. 9, 2010

(30) Foreign Application Priority Data

Jun. 4, 2009 (DE) .......................... 10 2009 026 705

(51) Int. Cl.
*F16H 57/08* (2006.01)

(52) U.S. Cl. ........................................ 475/331; 475/903

(58) Field of Classification Search .................. None
See application file for complete search history.

(56) References Cited

U.S. PATENT DOCUMENTS

| | | | | |
|---|---|---|---|---|
| 2,478,869 | A | * | 8/1949 | Hasbany ........................ 475/284 |
| 4,224,838 | A | * | 9/1980 | Roushdy et al. ................ 475/55 |
| 4,229,996 | A | * | 10/1980 | Hildebrand .................... 475/55 |
| 5,429,557 | A | | 7/1995 | Beim |
| 5,484,348 | A | * | 1/1996 | Brown et al. .................. 475/248 |
| 5,993,347 | A | * | 11/1999 | Park .............................. 475/280 |
| 7,195,575 | B2 | | 3/2007 | Kempf |
| 7,927,247 | B2 | * | 4/2011 | Bauknecht et al. ........... 475/275 |
| 2008/0153653 | A1 | * | 6/2008 | Diosi et al. .................... 475/276 |
| 2008/0269004 | A1 | * | 10/2008 | Diosi et al. .................... 475/276 |
| 2010/0041507 | A1 | * | 2/2010 | Gumpoltsberger et al. .. 475/275 |
| 2010/0041509 | A1 | * | 2/2010 | Gumpoltsberger et al. .. 475/275 |
| 2011/0009228 | A1 | * | 1/2011 | Bauknecht et al. ........... 475/275 |

FOREIGN PATENT DOCUMENTS

| | | |
|---|---|---|
| DE | 10 2005 013 277 A1 | 10/2005 |
| DE | 10 2005 014 592 A1 | 10/2006 |
| DE | 10 2008 000 429 A1 | 9/2009 |
| WO | 2009/106409 A1 | 9/2009 |

* cited by examiner

*Primary Examiner* — Dirk Wright
(74) *Attorney, Agent, or Firm* — Davis & Bujold, P.L.L.C.

(57) ABSTRACT

An arrangement for planetary gearsets comprises at least simple radially inner and radially outer planetary gearsets each comprising a sun gear, a ring gear and a carrier that carries planetary gears. The two gearsets are coaxially aligned and one of the gearsets is radially nested inside the sun gear of the other gearset. The ring gear of the radially inner gearset and the sun gear of the radially outer planetary gearset are at least coupled to one another in a rotationally fixed and are connected to a common carrier by driving teeth. To achieve a simple and inexpensive production, the ring gear of the radially inner gearset and the sun gear of the radially outer gearset are first produced as separate components with different heat treatments and then the ring and the sun gear are connected together by one of a friction force locking, a form interlocking and/or positive bonding.

6 Claims, 2 Drawing Sheets

ARRANGEMENT OF A PLANETARY GEARSET

This application claims priority from German patent application serial no. 10 2009 026 705.0 filed Jun. 4, 2009.

FIELD OF THE INVENTION

The invention concerns an arrangement of a planetary gearset, for example of a motor vehicle automatic transmission, with at least two simple planetary gearsets each comprising a sun gear, a ring gear and a carrier that carries a plurality of planetary gears, and which are arranged in a coaxial arrangement with one of the planetary gearsets radially nested inside the sun gear of the other planetary gearset in a common radial plane, or in radial planes that are axially slightly offset from one another, such that the ring gear of the radially inner planetary gearset and the sun gear of the radially outer planetary gearset are at least coupled to one another in a rotationally fixed manner and are connected, via gear teeth, with a common carrier.

BACKGROUND OF THE INVENTION

To produce a plurality of gear steps, modern automatic transmissions of motor vehicles usually consist of a number of planetary gearsets, which can be in the form of simple planetary gearsets and/or composite planetary gearsets, such as a Simpson gearset or a Ravigneaux gearset. The components of these planetary gearsets such as the sun gears, ring gears and carriers (planetary carriers) are, in some cases, coupled in a rotationally fixed manner to one another or, by means of associated frictional shifting elements, preferably made as disk clutches and disk brakes, they can be coupled to an input shaft, an output shaft or to one another, or locked relative to the transmission housing, in a selective manner, i.e., in each case in order to engage or disengage a particular gear step.

However, owing to the requirement that the drive engine should operate, as much as possible, in a speed range in which the specific fuel consumption is low, the number of gear steps is continuously increasing and this necessarily entails increasing the number of planetary gearsets that must be provided in an automatic transmission. But with the usual axially adjacent arrangement of the planetary gearsets, this results in greater axial structural length of the automatic transmission, such that, particularly in a motor vehicle, a front transverse installation of the drive unit consisting of the drive engine and the automatic transmission is made more difficult or even prevented.

Accordingly, several designs for multi-stage automatic transmissions with at least two simple planetary gearsets have been proposed in which one of the planetary gearsets is arranged coaxially with and radially inside the sun gear of the other planetary gearset. In this way the two planetary gearsets can be arranged in a common radial plane or in radial planes that are only slightly axially offset relative to one another so that there is one less gearset plane, compared with those in an axially adjacent arrangement, and the axial length of the respective automatic transmission is reduced.

A first automatic transmission, with a radially nested arrangement of two simple planetary gearsets, is known from U.S. Pat. No. 5,429,557 A. The two planetary gearsets are arranged coaxially over the output shaft and form the main gearset of this known automatic transmission. The ring gear of the radially inner planetary gearset and the sun gear of the radially outer planetary gearset are formed integrally, i.e., combined in a single, common transmission component. The planetary carriers of the two planetary gearsets are solidly connected to one another and are in driving connection with the output shaft.

In a first embodiment of this automatic transmission, six forward gears and one reverse gear can be engaged by means of three shift clutches and two shift brakes such that a driving connection, on the input side to the input shaft arranged axis-parallel to the output shaft, can be produced, respectively, by a first input stage with an underdrive transmission ratio and/or by a second input stage with an overdrive transmission ratio. In a second embodiment of the automatic transmission, six forward gears and one reverse gear can be engaged by means of two shift clutches and three shift brakes such that the input-side driving connection is produced by a single input stage with an individual transmission ratio and, if necessary, by a simple planetary gearset connected upstream from the main gearset.

A second automatic transmission, with a radially nested arrangement of two simple planetary gearsets, is described in a number of embodiments in DE 10 2005 014 592 A1. This known automatic transmission comprises four simple planetary gearsets coupled with one another. Two of the planetary gearsets are arranged in a common radial plane with one of the two planetary gearsets arranged radially inside the sun gear of the other of the two planetary gearsets of the upstream gearset. The ring gear of the radially inner planetary gearset and the sun gear of the radially outer planetary gearset are integrally coupled with one another. In this known automatic transmission, eight forward gears and one reverse gear can be engaged by means of three shift clutches and two shift brakes.

A further automatic transmission, with a radially nested arrangement of two simple planetary gearsets, is the object of a previously un-published DE 10 2008 000 429.4 by the present applicant. A number of embodiments of the automatic transmission described therein comprise, in each case, an upstream gearset and a main gearset. Whereas in all the embodiments, the upstream gearset consists of two coupled simple planetary gearsets, the main gearset is formed either as two coupled simple planetary gearsets or as a Ravigneaux gearset.

The two planetary gearsets of the upstream gearset, in some embodiments, are arranged in radial planes that are slightly axially offset relative to one another and, in other embodiments, are in a common radial plane, whereby the first planetary gearset is arranged inside the sun gear of the second planetary gearset. The ring gear of the radially inner planetary gearset and the sun gear of the radially outer planetary gearset are solidly connected to one another.

The carriers of the two planetary gearsets are also solidly connected to one another and, depending on the embodiment concerned, are coupled in a rotationally fixed manner to the ring gear of the first planetary gearset of the main gearset, to the small sun gear of the Ravigneaux gearset, or to the large sun gear of the Ravigneaux gearset. With each embodiment of this automatic transmission, nine forward gears and one reverse gear can be engaged by means of three shift clutches and three shift brakes such that to avoid drag torques of disengaged frictional shift elements, in each case, one shift clutch and one shift brake are made as claw couplings.

In the automatic transmissions described, the rotationally fixed coupling of the ring gear of the radially inner planetary gearset to the sun gear of the radially outer planetary gearset is, in each case, produced by making the two components integral, i.e., combining them in a common transmission component. In DE 10 2005 014 592 A1, however, it is mentioned that the ring gear and the sun gear concerned can also be made as separate components which, in a manner not described further, can be connected to one another either solidly rotationally fixed or, for the sake of acoustic decoupling, via an elastic intermediate layer made from an elastomeric plastic which allows a limited amount of elastic relative rotation.

A design, known per se and illustrated in the sectional view shown in FIG. 3 of DE 10 2005 014 592 A1, for axial and radial mounting and for the driving connection of the gearwheels connected integrally to one another, namely, the ring gear of the radially inner planetary gearset and the sun gear of the radially outer planetary gearset, consists in that the common transmission component is connected, by means of driving teeth, to a disk-shaped carrier. In turn, the carrier is mounted by means of axial bearings relative to axially adjacent components and by means of a radial bearing on the centrally arranged input shaft of the automatic transmission concerned, and is in driving connection with a shift clutch arranged outside the area shown in the figure. The driving teeth consist of a set of inner teeth formed on the gearwheel side by the axially extended teeth of the ring gear of the common transmission component and a corresponding set of outer teeth arranged on the carrier side on the radially outer rim of the carrier. By means of a circlip held in a ring groove arranged close to the axial outer rim of the inner teeth on the carrier side, the common transmission component, namely, the combined sun gear-ring gear, is axially guided at least in one direction.

Since, owing to the tooth geometry, the outer teeth of the sun gear of the radially outer planetary gearset are loaded more severely in terms of surface pressure than the inner teeth of the ring gear of the radially inner planetary gearset, the sun gear usually has to be hardened whereas for the ring gear, in contrast, a tempering treatment, for example, by nitrocarburizing, would be sufficient. But if the integrally made common sun gear-ring gear transmission component is hardened, this necessarily leads to some distortion which makes it necessary to carry out mechanical finish-machining of the ring gear teeth, for example, by grinding. Disadvantageously, this entails more production effort and correspondingly increased costs.

A further disadvantage is that the outer teeth of the carrier have to be helically geared, with higher production cost and effort since the teeth of the planetary gearsets and also the inner teeth of the ring gear of the common sun gear-ring gear transmission component, used as driving teeth, are usually helically geared in order to avoid louder gearing noise.

SUMMARY OF THE INVENTION

Against this background the purpose of the present invention is to propose a transmission component of two simple planetary gearsets radially nested in the manner described earlier, which combines the ring gear of the radially inner planetary gearset and the sun gear of the radially outer planetary gearset, and which can be produced simply and inexpensively.

The invention starts from a gearset arrangement known per se, of a planetary transmission, for example, a motor vehicle automatic transmission, which comprises two simple planetary gearsets each with a sun gear, a ring gear and a carrier carrying a plurality of planetary gears, which are arranged with a coaxially nested arrangement of one of the planetary gearsets radially inside the sun gear of the other planetary gearset in a common radial plane or in radial planes slightly axially offset relative to one another. In the gearset arrangement considered, the two planetary gearsets are coupled to one another at least in that the ring gear of the radially inner planetary gearset and the sun gear of the radially outer planetary gearset are at least coupled, in a rotationally fixed manner, to one another and are connected by driving teeth to a common carrier.

A first solution of this objective provides that the ring gear of the radially inner planetary gearset and the sun gear of the radially outer planetary gearset are first made as separate components with different heat treatments, and are then connected to one another solidly, i.e. in a rotationally fixed manner and with no axial or radial lay, by force locking and/or shape interlocking and/or positive bonding means.

For the solution of the objective, to enable separate processing in particular of the teeth of the ring gear of the radially inner planetary gearset and those of the sun gear of the radially outer planetary gearset, according to the invention these two gearwheels are made as separate components, with different heat treatments, and then solidly connected to one another in a suitable manner, i.e., rotationally fixed and free from axial and radial play.

Thus, regarding the assembly within the gearset arrangement of the two planetary gearsets there is no difference from the integral construction of the two gearwheels known from the prior art. However, thanks to their originally separate production, the two gearwheels can be optimally mechanically machined and heat treated before they are connected. Thus, owing to the severe loading of its sun gear teeth, the sun gear can be hardened without distortion of the ring gear whereas, owing to the less severe loading of its ring gear teeth, the ring gear can be tempered, for example, by nitrocarburizing.

A friction-force-locked connection of the two gearwheels can be formed such that the ring and sun gears, in the area of an outer cylindrical section of the ring gear and an inner cylindrical section of the sun gear, are arranged to overlap one another axially and are friction force connected, between the two cylindrical sections, by a press fit.

A form-interlocked and force-locked connection of the two gearwheels is possible in that the ring and sun gears, in the area of an outer cylindrical section of the ring gear and an inner cylindrical section of the sun gear, are arranged to overlap one another axially and are connected together with both form interlock and friction force by means of serrations formed in the cylindrical sections.

A positively bonded connection of the two gearwheels is preferably produced by arranging the ring and sun gears with axial overlap in the area of an outer cylindrical or conical section of the ring gear and an inner cylindrical or conical section of the sun gear, and welding them to one another, for example, along an axially outer edge of the ring gear or the sun gear.

Regardless of the type of connection between the two gearwheels, it is preferable that the inner teeth of the driving tooth array are arranged on an overlap-free section of the sun gear. This enables the inner teeth on the sun gear to be formed independently of the teeth of the ring gear.

Expediently, this possibility is used to enable the driving teeth, formed from the inner teeth of the sun gear, and the outer teeth of the carrier to be made as straight teeth, which is simpler and less expensive from the standpoint of production technology.

A second solution according to the invention for the objective set consists in making the ring gear, of the radially inner planetary gearset, and the sun gear, of the radially outer planetary gearset, as separate components with different heat treatments and connecting them, at least in a rotationally fixed manner, with one another and with the carrier.

In this design according to the invention as well, the two gearwheels are made as separate components with different heat treatments to enable separate machining of, in particular, the teeth of the ring gear of the radially inner planetary gearset and the sun gear of the radially outer planetary gearset. However, the at least rotationally fixed connection of the two gearwheels with one another and to the carrier takes place this time in combination with the driving teeth, i.e., with form interlocking during the assembly with the carrier. This saves a separate working step in connecting the ring gear of the radially inner planetary gearset to the sun gear of the radially outer planetary gearset.

In this case, according to the invention, the form-interlocked connection of the two gears and the carrier is preferably carried out by arranging the ring gear and the sun gear on the carrier side in the area of an outer cylindrical section of the ring gear and an inner cylindrical section of the sun gear with axial overlap relative to one another and, close to the outer rim of the overlap zone, arranging radially through-going carrier openings axially open on one side distributed around the periphery of the ring gear, and carrier openings radially closed on the outside and axially open on one side on the sun gear, in which correspondingly positioned driving teeth of the carrier engage in the assembled condition.

The ring gear is provided, axially on the outside and close to the assembled position of the carrier's driving teeth radially on the inside, with a ring groove for a circlip and, at the axially opposite end of the overlap zone, radially on the outside with an abutment collar for the sun gear for the axial guiding of the ring gear and the sun gear by the carrier.

The sun gear can be centered by the carrier if the tooth tips of at least some of the driving teeth of the carrier are provided with radially projecting mating surfaces which, in the assembled condition, fit without play against the radial bounding bottoms of the carrier openings of the sun gear. The shape of the mating surfaces is adapted to match the contour of the bounding bottoms of the sun gear's carrier openings. Preferably, the bounding bottoms of the carrier openings and the mating surfaces on the tooth tips of the driving teeth are straight or cylindrical.

Similarly, the ring gear can be centered by the carrier if at least some tooth gaps of the carrier are provided, at the bottom of the tooth gaps, with raised cylindrical mating surfaces which, in the assembled condition and depending on the design of the corresponding inner area of the ring gear, rest without play against a cylindrical inside wall or against the tooth tips of the teeth of the ring gear.

In a further development of the invention, in the case of the axially through-going design of the ring teeth of the ring gear which is simpler to produce, to achieve rotationally symmetrical force and strength distribution, it is provided that the number of driving teeth of the carrier is an integer fraction of the number of ring teeth and that the carrier openings of the ring gear are arranged symmetrically relative to the ring teeth.

BRIEF DESCRIPTION OF THE DRAWINGS

To clarify the invention, the description of a drawing with example embodiments is attached, which shows.

DETAILED DESCRIPTION OF THE PREFERRED EMBODIMENTS

Figure 1:
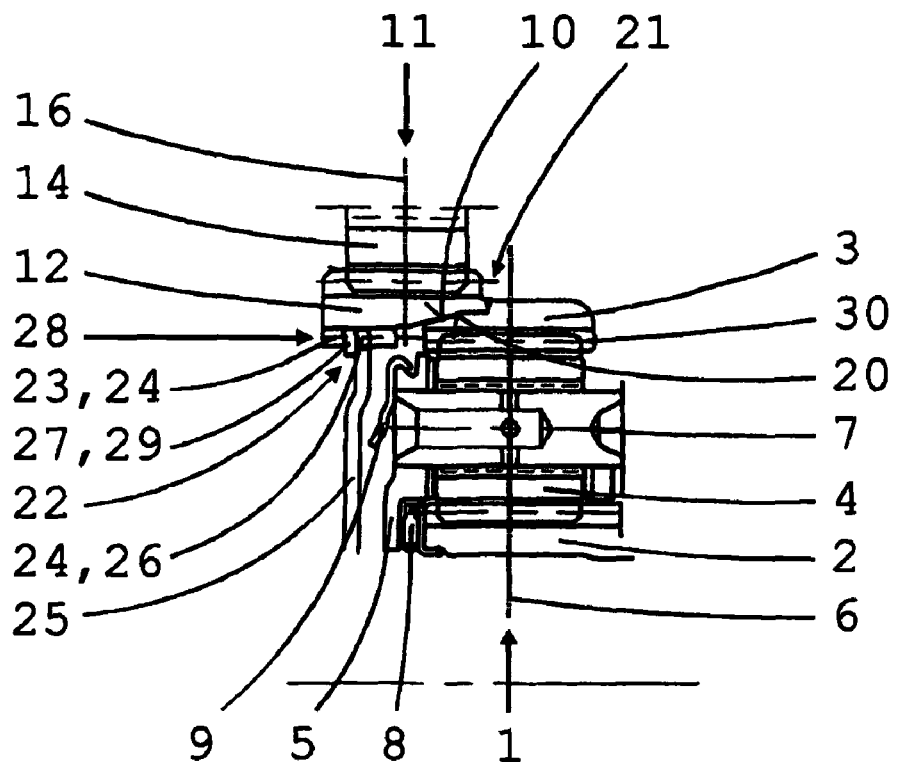
FIG. 1: A first preferred embodiment of the gearset arrangement according to the invention, viewed in a partial longitudinal central section.

In the view shown in FIG. 1, a gearset arrangement of two simple planetary gearsets 1, 11, each having a sun gear 2, 12, a ring gear 3 and a carrier 5 (planetary carrier) supporting a plurality of planetary gears 4, 14 is represented as part of a longitudinal central section through a transmission. The two planetary gearsets 1, 11 are in a coaxially nested arrangement with one of the planetary gearsets 1 radially inside the sun gear 12 of the other planetary gearset, in radial planes 6, 16 that are axially slightly offset relative to one another.

In FIG. 1 can be seen the sun gear 12 and a planetary gear 14 of the radially outer planetary gearset 11 that meshes with it, and the sun gear 2, the ring gear 3 and a planetary gear 4 that meshes with those gears 2, 3 and is mounted to rotate on a planetary pin 7 of the associated carrier 5 of the radially inner planetary gearset 1. The carrier 5 of this planetary gearset 1 is supported, radially on the inside, by an axial bearing 8 axially relative to the associated sun gear 2 and is provided, radially on the outside, with an oil capturing baffle 9 to ensure a supply of lubrication oil to the mounting bearing of the planetary gears 4.

In the area of an outer conical section 10 of the ring gear 3 and an inner conical section 20 of the sun gear 12, the ring gear 3 of the radially inner planetary gearset 1 and the sun gear 12 of the radially outer planetary gearset 11 are arranged with an axial overlap, relative to one another, and are welded together along the axially outer edge 21 of the sun gear 12 facing toward the ring gear 3, i.e., they are connected to one another in a rotationally fixed manner and with no axial and radial play.

By virtue of inner teeth 23 of a driving tooth array 24 on an overlap-free section of the sun gear 12 and outer teeth 26 of the driving tooth array 24 arranged on a disk-shaped carrier 25, the two welded together gearwheels 3, 12 are connected at least in a rotationally fixed manner to the carrier 25.

With a radial-play-free design of the driving teeth 24 and suitable mounting of the carrier 25, for example, on a central transmission shaft, the two gearwheels 3, 12 are also radially mounted by virtue of the carrier 25 and thus centered. A circlip 27 is set into a ring groove 29, positioned close to the axially outer edge 28 of the inner teeth 23 of the sun gear 12, to support the two gearwheels 3, 12, at least axially on one side relative to the carrier 25, Since the ring gear 3 of the radially inner planetary gearset 1 and the sun gear 12 of the radially outer planetary gearset 11 are originally made as separate components, i.e., before being connected by welding, they can be mechanically machined independently and, in particular, heat treated differently as appropriate for the loading of their respective teeth. Owing to the arrangement of the inner teeth 23 of the driving tooth array 24 on the sun gear 12, the entire driving tooth array, i.e., also the outer teeth 26 of the carrier 25 can, in particular, be made as straight teeth regardless of the fact that the ring teeth 30 of the ring gear 3 are usually made as helical teeth.

Figure 2:
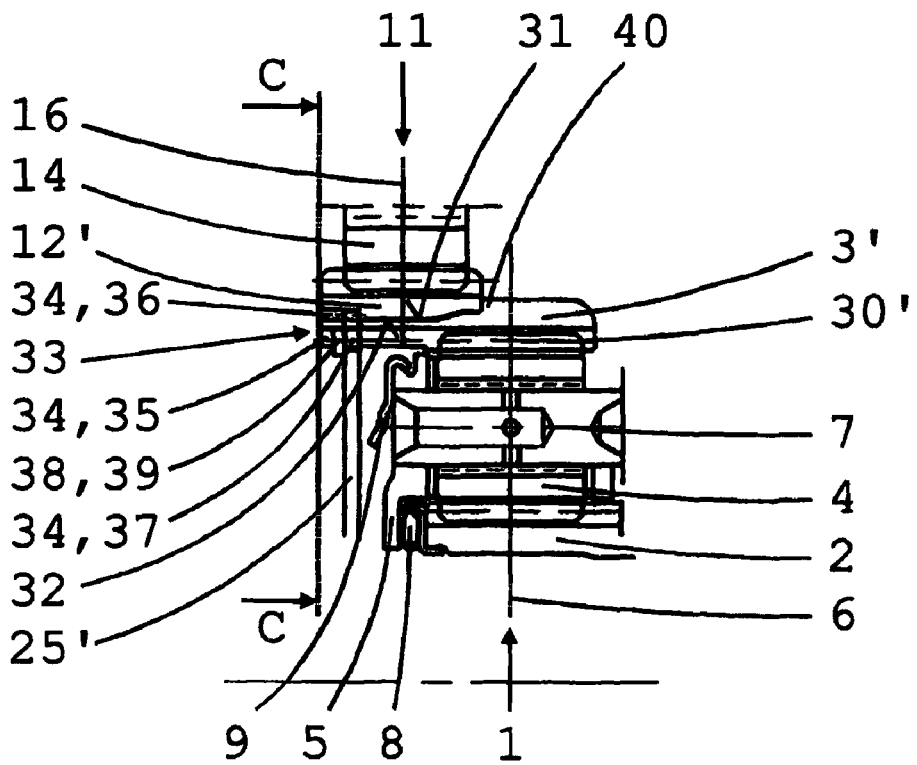
FIG. 2: A second preferred embodiment of the gearset arrangement according to the invention, viewed in a partial longitudinal central section.
Figure 3:
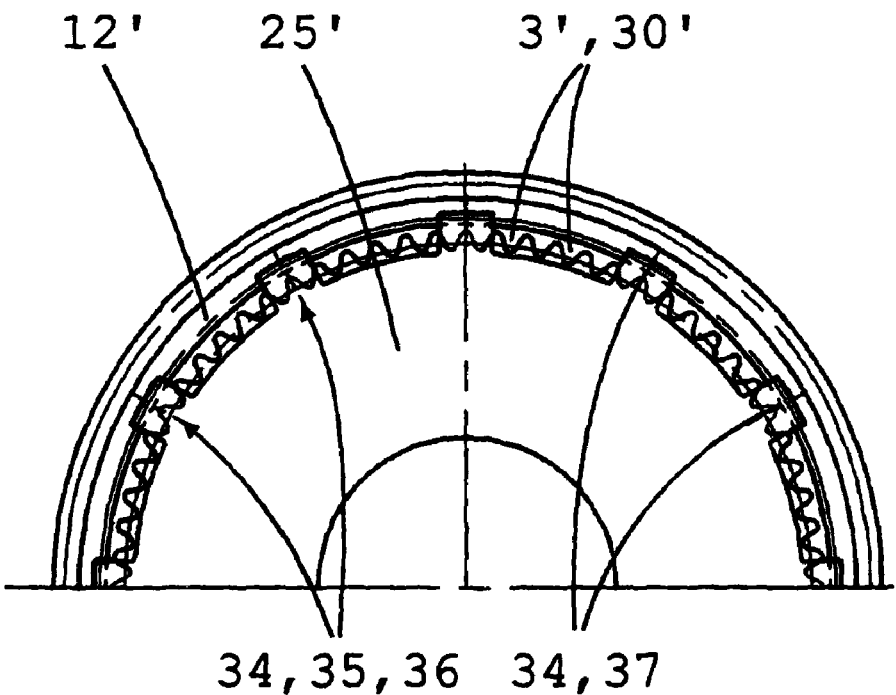
FIG. 3: Partial axial view of the representation in FIG. 2.
Figure 4:
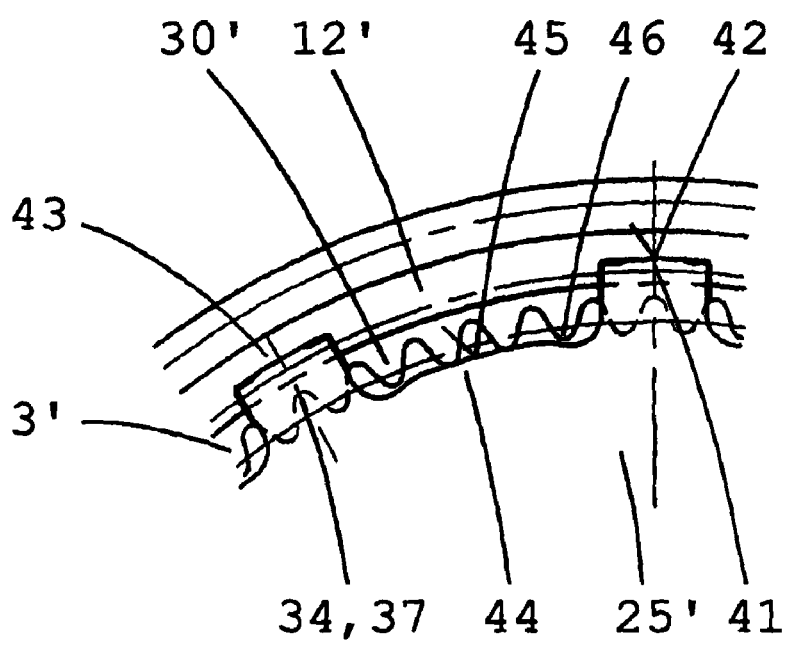
FIG. 4: Enlarged section of the axial view in FIG. 3.

Another embodiment of the connection of the ring gear 3' of the radially inner planetary gearset 1 to the sun gear 12' of the radially outer planetary gearset 11 and of the two gears 3', 12' to the carrier 25' is illustrated in FIG. 2 analogously to FIG. 1 in a partial longitudinal central section, and in FIG. 3 by an axial view looking along the direction C-C in FIG. 2, and in FIG. 4 as an enlarged section of the axial view of FIG. 3. In this embodiment, similar to the arrangement shown in FIG. 1, the two planetary gearsets 1, 11 are positioned in a coaxially arrangement with one of the planetary gearsets 1 radially nested inside the sun gear 12' of the other planetary gearset 11, in radial planes 6, 16 that are slightly axially offset relative to one another.

In this case, although the ring gear 3' of the radially inner planetary gearset 1 and the sun gear 12' of the radially outer planetary gearset 11 are again made as separate components with different heat treatments, they are now connected in a rotationally fixed manner to one another and also to the carrier 25' exclusively by a driving tooth array 34.

To connect all three components 3', 12' and 25', the ring gear 3' and the sun gear 12' are arranged with axially overlap relative to one another on the carrier side in an outer cylindrical section 31 of the ring gear 3' and an inner cylindrical section 32 of the sun gear 12'. In addition, for this purpose, close to the axially outer edge 33 of the overlap zone and distributed round the periphery, radially through-going carrier openings 35, axially open on one side, are formed on the ring gear 3', and carrier openings 36 radially closed on the outside and axially open on one side are formed on the sun gear 12', in which (35, 36) corresponding radial driving teeth 37 of the carrier 25' engage in the assembled condition.

For the axial guidance of the ring gear 3' and the sun gear 12' by the carrier 25', close to the assembled position of the driving teeth 37 of the carrier 25', the ring gear 3' is provided, radially on the inside, with a ring groove 38 to receive a circlip 39 and radially on the outside, at the axially opposite end of the overlap zone, with an abutment collar 40 for the sun gear 12'.

As can be seen more clearly in the axial views shown in FIGS. 3 and 4, in which the circlip 39 is omitted, to center the sun gear 12', the driving teeth 37 of the carrier 25' are provided, at their tooth tips 41, with radially projecting cylindrical mating surfaces 42 which, in the assembled condition, rest against the cylindrically shaped radial bounding bottoms 43 of the carrier openings 36 of the sun gear 12' without any play. To center the ring gear 3', the tooth gaps of the carrier 25' are provided at their tooth gap bottoms 44 with radially projecting cylindrical mating surfaces 45 which, in the assembled condition, rest against the tooth tips 46 of the axially through-going ring teeth 30' of the ring gear 3' without play.

To achieve rotationally symmetrical force and strength distribution at the transition between the driving teeth 37 of the carrier 25' and the carrier openings 35 of the ring gear 3', the number of driving teeth 37 of the carrier 25' is an integer fraction of the number of ring teeth 30', and the carrier openings 35 of the ring gear 3' are arranged symmetrically relative to the ring teeth 30'. In the example embodiment shown, the carrier 25' has twelve driving teeth 37 and there are seventy-two ring teeth 30'.

In this embodiment of the ring gear 3' of the radially inner planetary gearset 1, the sun gear 12' of the radially outer planetary gearset 11 and the carrier 25' as well, there can be independent mechanical machining and different heat treatments of the two gears, 3', 12', and the design of the driving teeth 25' can be largely independent of the ring teeth 30' of the ring gear 3'.

INDEXES

1 Radially inner planetary gearset
2 Sun gear
3 Ring gear
3' Ring gear
4 Planetary gear
5 Carrier, planetary carrier
6 Radial plane
7 Planetary pin
8 Axial bearing
9 Oil capturing baffle
10 Outer conical section
11 Radially outer planetary gearset
12 Sun gear
12' Sun gear
14 Planetary gear
16 Radial plane
20 Inner conical section
21 Axially outer edge
22 Overlap-free section
23 Inner teeth
24 Driving tooth array
25 Carrier
25' Carrier
26 Outer teeth
27 Circlip
28 Axially outer edge
29 Ring groove
30 Ring gear teeth
30' Ring gear teeth
31 Outer cylindrical section
32 Inner cylindrical section
33 Axially outer edge
34 Driving tooth array
35 Carrier opening
36 Carrier opening
37 Driving tooth
38 Ring groove
39 Circlip
40 Abutment collar
41 Tooth tip
42 Mating surface
43 Bounding bottom
44 Tooth gap bottom
45 Mating surface
46 Tooth tip

The invention claimed is:

1. A gearset arrangement of a planetary transmission, the gearset arrangement comprising:

at least a simple radially inner planetary gearset (1) and a simple radially outer planetary gearset (11) each comprising a sun gear (2, 12'), a ring gear (3') and a carrier (5) that carries a plurality of planetary gears (4, 14);

the radially inner and radially outer planetary gearsets (1, 11) being coaxially arranged such that the radially inner planetary gearset (1) being radially nested inside the sun gear (12) of the radially outer planetary gearset (11) in one of a common radial plane and adjacent radial planes (6, 16) being axially offset with respect to one another;

the ring gear (3) of the radially inner planetary gearset (1) and the sun gear (12) of the radially outer planetary gearset (11) being at least coupled to one another in a rotationally fixed manner and being connected by gearing teeth (34) to a common carrier (25'), the ring gear (3') of the radially inner planetary gearset (1) and the sun gear (12') of the radially outer planetary gearset (11) being separate components having different heat treatments and being connected together and, via the gearing teeth (34), to the common carrier (25') in a rotationally fixed manner on a carrier side in an area of an outer cylindrical section (31) of the ring gear (3') of the radially inner planetary gearset (1) and an inner cylindrical section (32) of the sun gear (12') of the radially simple planetary gearset (11);

the ring gear (3') and the sun gear (12') being arranged with at least a partial axial overlap relative to one another, and adjacent to an axially outer edge (33) of the at least partial axial overlap, distributed around the periphery, radially through-going carrier openings (35), being axially open on one side, are arranged on the ring gear (3') and carrier openings (36), radially closed on an outside and axially open on one side, being arranged on the sun gear (12') in which corresponding radial gearing teeth (37) of the carrier (25') engage in an assembled condition.

2. The gearset arrangement according to claim 1, wherein for axially guiding the ring gear (3') and the sun gear (12') by the carrier (25'), the ring gear (3') is provided, axially on the outside adjacent to the assembled position of the gearing teeth (37) of the carrier (25'), radially on the inside with a ring groove (38) for a circlip (39) and, at the axially opposite end of the axial overlap, radially on the outside with an abutment collar (40) for the sun gear (12').

3. The gearset arrangement according to claim 1, wherein, for centering the sun gear (12'), at least some of the gearing teeth (37) of the carrier (25') are provided with radially projecting mating surfaces (42), on their tooth tips (41), which, in the assembled condition, rest in play-free contact against radial bounding bottoms (43) of the carrier openings (36) of the sun gear (12').

4. The gearset arrangement according to claim 1, wherein, for centering the ring gear (3'), at least some tooth gaps of the carrier (25') are provided with radially projecting cylindrical mating surfaces (45), at their tooth gap bottoms (44), which rest, in the assembled condition, in play-free contact against one of a cylindrical inner wall and the tooth tips (46) of the ring teeth (30') of the ring gear (3').

5. The gearset arrangement according to claim 1, wherein a number of driving teeth (37) of the carrier (25') is an integer fraction of a number of ring teeth (30'), and carrier openings (35) of the ring gear (3') are arranged symmetrically relative to the ring teeth (30'), for an axially through-going design of the ring teeth (30') of the ring gear (3').

6. A gearset arrangement of a planetary transmission, the gearset arrangement comprising an inner planetary gearset (1) comprising a sun gear (2), a ring gear (3') and a planetary carrier (5) supporting planetary gears (4) and the ring gear (3') of the inner planetary gearset (1) comprises a radially outer cylindrical section (31);

an outer planetary gearset (11) comprising a sun gear (12'), a ring gear, and a plurality of planetary gears (14) and the sun gear (12') of the outer planetary gearset (11) comprising a radially inner cylindrical section (32);

the inner planetary gearset (1) being coaxial with the outer planetary gearset (11) and radially nested within the sun gear (12') of the outer planetary gearset (11), the inner planetary gearset (1) being aligned with a first radial plane (6) and the outer planetary gearset (11) being aligned with a second radial plane (16) with the first and the second radial planes (6, 16) being axially offset from one another;

the ring gear (3') of the inner planetary gearset (1) being rotationally fixed to the sun gear (12') of the outer planetary gearset (11) and the ring gear (3') of the inner planetary gearset (1) and the sun gear (12') of the outer planetary gearset (11) being connected, via gearing teeth (34), to a common carrier (25');

the ring gear (3') of the inner planetary gearset (1) and the sun gear (12') of the outer planetary gearset (11) being independent of one another and being formed separately from one another by different heat treatments;

the ring gear (3') of the inner planetary gearset (1) and the sun gear (12') of the outer planetary gearset (11) being aligned such that the radially outer cylindrical section (31) of the ring gear (3') of the inner planetary gearset (1) axially overlaps the radially inner cylindrical section (32) of the sun gear (12') of the outer planetary gearset (11); and the ring gear (3') of the inner planetary gearset (1) comprising, about a periphery thereof, radial carrier openings (35) being axially open on one side and the sun gear (12') of the outer planetary gearset (11) comprising, about a periphery thereof, carrier openings (36) being radially closed on an outside and being axially open on one side, and, following assembly of the gearset arrangement, engaging corresponding radial driving teeth (37) of the common carrier (25').

* * * * *